United States Patent [19]
Lindner et al.

[11] 4,217,297
[45] Aug. 12, 1980

[54] PROCESS FOR THE PREPARATION OF CARBONIC ACID ARYL ESTERS OF POLYESTER-DIOLS LENGTHENED VIA CARBONATE GROUPS

[75] Inventors: Christian Lindner, Cologne; Carlhans Süling; Herbert Bartl, both of Odenthal; Manfred Schreckenberg; Dieter Freitag, both of Krefeld; Klaus König, Leverkusen, all of Fed. Rep. of Germany

[73] Assignee: Bayer Aktiengesellschaft, Leverkusen, Fed. Rep. of Germany

[21] Appl. No.: 886,212

[22] Filed: Mar. 13, 1978

[30] Foreign Application Priority Data

Mar. 22, 1977 [DE] Fed. Rep. of Germany ....... 2712435

[51] Int. Cl.² .................. C07C 68/06; C08G 63/62
[52] U.S. Cl. .................... 260/463; 525/439
[58] Field of Search .................. 260/463; 528/273

[56] References Cited
U.S. PATENT DOCUMENTS

| 3,030,331 | 4/1962 | Goldberg | 260/42 |
| 3,030,335 | 4/1962 | Goldberg | 260/47 |
| 3,161,615 | 12/1964 | Goldberg | 260/47 |
| 3,169,121 | 2/1965 | Goldberg | 260/463 |
| 3,207,814 | 9/1965 | Goldberg | 260/463 |
| 3,220,976 | 11/1965 | Goldberg | 260/47 |
| 3,287,442 | 11/1966 | Caldwell et al. | 260/858 |
| 3,290,409 | 12/1966 | Munro | 260/860 |
| 3,444,141 | 5/1969 | Shima | 260/75 |
| 3,449,467 | 6/1969 | Wynstra | 260/463 |
| 3,461,187 | 8/1969 | Cantrill | 260/873 |
| 3,549,682 | 12/1970 | Vernaleken et al. | 260/463 |
| 3,553,167 | 1/1971 | Schnell et al. | 260/47 |
| 3,641,200 | 2/1972 | Matzner | 260/860 |
| 3,714,125 | 1/1973 | Shima et al. | 260/75 M |
| 3,843,708 | 10/1974 | Matzner | 260/463 |
| 3,843,752 | 10/1974 | Katayama et al. | 260/873 |
| 4,105,633 | 8/1978 | Swart et al. | 260/463 |

FOREIGN PATENT DOCUMENTS

| 1964998 | 7/1977 | Fed. Rep. of Germany . |
| 2636784 | 2/1978 | Fed. Rep. of Germany . |
| 2235965 | 6/1973 | France . |
| 69-11377 | 5/1969 | Japan . |
| 954500 | 4/1964 | United Kingdom . |
| 965085 | 7/1964 | United Kingdom . |
| 1139413 | 1/1969 | United Kingdom . |
| 1190303 | 5/1970 | United Kingdom . |
| 1270077 | 4/1972 | United Kingdom . |
| 898775 | 6/1972 | United Kingdom . |
| 1422676 | 1/1976 | United Kingdom . |

OTHER PUBLICATIONS

E. Goldberg, J. of Polymer Sci., Part C, No. 4, pp. 707-730, Elastomeric Block Copolymers (1963).
S. Merrill, J. of Polymer Sci., vol. 55, pp. 343-352 (1961) Block Copolymers Based on 2,2-bis(4-Hydroxyphenyl)-propane Polycarbonate.
S. Merrill et al., J. of Polymer Sci., Part A, vol. 3, pp. 2189-2203 (1965).

Primary Examiner—Donald G. Daus
Assistant Examiner—M. C. Eakin
Attorney, Agent, or Firm—Gene Harsh; Lawrence S. Pope

[57] ABSTRACT

The present invention relates to a process for the preparation of bis-carbonic acid monoaryl esters of polyester-diols, lengthened via —OCOO— groups, characterized in that polyester-diols with molecular weights $\overline{M}n$ (number-average) of over 250, preferably over 600, are heated with carbonic acid bis-aryl esters at temperatures between about 100° C. and 200° C., preferably between about 110° C. and 180° C., in vacuo below about 35 mm Hg, preferably between about 25 and 1 mm Hg, in the presence of catalysts, less than one mol of carbonic acid bis-aryl ester being employed per mol of OH group of the polyester-diol and the hydroxyaryl compounds formed being distilled off.

The invention further relates to the bis-carbonic acid aryl esters of polyester-diols lengthened via —OCOO— groups.

15 Claims, No Drawings

PROCESS FOR THE PREPARATION OF CARBONIC ACID ARYL ESTERS OF POLYESTER-DIOLS LENGTHENED VIA CARBONATE GROUPS

BACKGROUND OF THE INVENTION

Bis-carbonic acid monoaryl esters which are derived from aliphatic polyester-polyols can be prepared, for example, by reacting polyester-diols with diarylcarbonates in the presence of special catalysts according to German Patent Application P 2,651,639.2 which corresponds to U.S. patent application Ser. No. 845,174, filed Oct. 25, 1977. Products of this type are valuable starting materials for various block copolymers and are, therefore, readily transesterified, for example with bis-phenols. The compounds thus obtained can then be used for preparing, for example, polycarbonate/polyester block copolymers, as described in German Published Patent Specification No. 2,651,639.

It has now surprisingly been found that polyester-diols with molecular weights ($\overline{M}n$) of over about 250, preferably over 600, can be reacted with carbonic acid diaryl esters to give mixed aliphatic-aromatic carbonic acid esters at reaction temperatures up to 200° C. in a manner such that bis-carbonic acid monoaryl esters of polyester-diols lengthened via —OCOO— groups are formed.

This reaction proceeds smoothly and without side reactions such as, for example, etherification of the terminal OH groups (for this, compare Japanese Auslegeschrift (Japanese Published Specification) 6,911,377).

The molecular non-uniformity determined by the starting materials is insignificantly changed by the process according to the invention, i.e., the characteristic molecular weight distribution for a polyester-diol remains virtually unchanged, but is shifted towards higher molecular weights.

SUMMARY OF THE INVENTION

The present invention thus relates to a process for the preparation of bis-carbonic acid monoaryl esters of polyester-diols, lengthened via —OCOO— groups, with a $\overline{M}n$ of over about 250, preferably over about 600, and carbonic acid bis-aryl esters, characterized in that polyester-diols with molecular weights $\overline{M}n$ (number-average) of over 250, preferably over 600, are heated with carbonic acid bis-aryl esters at temperatures between about 100° C. and 200° C., preferably between about 110° C. and 180° C., in vacuo below about 35 mm Hg, preferably between about 25 and 1 mm Hg, in the presence of catalysts, less than one mol of carbonic acid bis-aryl ester being employed per mol of OH group of the polyester-diol and the hydroxyaryl compounds formed being distilled off.

The invention further relates to the bis-carbonic acid aryl esters, obtained according to the invention, of polyester-diols lengthened via —OCOO— groups.

DETAILED DESCRIPTION OF THE INVENTION

The polyesters, containing hydroxyl groups, in the sense of the invention are, for example, reaction products of polyhydric, preferably dihydric and optionally additionally trihydric, alcohols with polybasic, preferably dibasic, carboxylic acids. Instead of the free polycarboxylic acids, the corresponding polycarboxylic acid anhydrides or corresponding polycarboxylic acid esters of lower alcohols or mixtures thereof can also be used for the preparation of the polyester-polyols. The polycarboxylic acids can be of an aliphatic, cycloaliphatic, aromatic and/or heterocyclic nature and can optionally be substituted, for example by halogen atoms, and/or unsaturated. Examples of these which may be mentioned are: oxalic acid, malonic acid, succinic acid, adipic acid, suberic acid, azelaic acid, sebacic acid, phthalic acid, terephthalic acid, isophthalic acid, trimellitic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid and dimeric and trimeric fatty acids, such as oleic acid, optionally mixed with monomeric fatty acids. Polyhydric alcohols which can be used, optionally mixed with one another, are, for example, ethylene glycol, propylene 1,2-glycol and propylene 1,3-glycol, butylene 1,4-glycol and butylene 2,3-glycol, hexane-1,6-diol, octane-1,8-diol, neopentylglycol, cyclohexanedimethanol, 1,4-bis-(hydroxymethyl)-cyclohexane, 2-methyl-propane-1,3-diol, glycerol, trimethylolpropane, hexane-1,2,6-triol, butane-1,2,4-triol, trimethylolethane, pentaerythritol and quinitol, furthermore thiodiglycol, diethylene glycol, triethylene glycol, tetraethylene glycol, polyethylene glycol, dipropylene glycol, polypropylene glycols, dibutylene glycol and polybutylene glycols.

The content of terminal hydroxyl groups and thus the "average" molecular weight $\overline{M}n$ is determined by choosing a defined excess of alcohol. Polyesters obtained from aliphatic starting components are preferably employed.

Polyesters containing hydroxyl groups, in the sense of the invention are, for example, also those which are prepared by the polymerization of a lactone, for example of ε-caprolactone, or by the condensation of a hydroxycarboxylic acid, for example of ω-hydroxycaproic acid, with a starting material containing hydroxyl groups. $\overline{M}n$ can again be calculated as described above.

The polyester-polyols suitable for the process according to the invention preferably have 2 to 4 hydroxyl groups, and particularly preferably 2 hydroxyl groups.

Carbonic acid bis-aryl esters in the sense of the invention are, in particular, those of the formula (I)

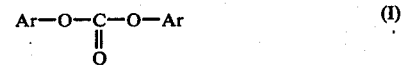

wherein
Ar is a substituted or unsubstituted aryl radical with 6 to 18 carbon atoms.

Possible substituents are, in particular, $C_1$–$C_4$-alkyls as well as nitro and halogen, such as, for example, chlorine or bromine. Examples of these compounds are diphenyl carbonate, alkyl-substituted diphenyl carbonates, such as di-toluyl carbonates, halogen-substituted diphenyl carbonates, such as di-chlorophenyl carbonates, dinaphthyl carbonate and alkyl-substituted and halogen-substituted dinaphthyl carbonates; in these compounds, the nitro, alkyl or halogen substituents on the two phenyl nuclei or, respectively, on the two naphthyl nuclei of the diaryl carbonates can be identical or different and can be symmetrical or asymmetrical to one another. Thus, for example, phenyl toluyl carbonate, phenyl chlorophenyl carbonate, 2-toluyl 4-toluyl carbonate or 4-toluyl 4-chlorophenyl carbonate are also suitable for the process according to the invention.

Bis-aryl carbonates, in the sense of the invention, of polyester-diols lengthened via —OCOO— groups are thus, in particular, those of the formula II

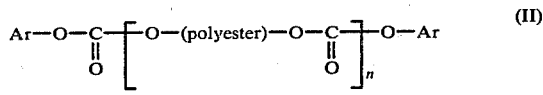

wherein
Ar is a substituted or unsubstituted aryl radical with 6 to 18 carbon atoms,
—(polyester)— represents the bivalent radical of one of the polyester-diols described above and n denotes an integer from 2 to 20, preferably 2 to 10.

Suitable catalysts for the process according to the invention are basic transesterification catalysts, such as, for example, alkali metal phenolates or alkaline earth metal phenolates, alkali metal alcoholates or alkaline earth metal alcoholates and tertiary amines, such as, for example, triethylenediamine, morpholine, pyrrolidine, pyridine or triethylamine, or metal compounds, such as antimony trioxide, zinc chloride, titanium tetrachloride and titanic acid tetrabutyl ester.

The catalyst is used in amounts between 20 ppm and 200 ppm, relative to the total weight of the polyester-diol and the carbonic acid bis-aryl ester employed.

Less than these amounts of catalyst can also optionally be employed if the starting materials contain no basic impurities when acid catalysts are used and contain no acid impurities when basic catalysts are used. Moreover, to minimize the intrinsic color in the carbonic acid esters, of the polyester-diols, minimal amounts of catalysts are preferred.

The process according to the invention is preferably carried out in bulk, that is to say in the absence of a solvent. However, solvents which are inert under the reaction conditions, such as aliphatic hydrocarbons or aromatic hydrocarbons, which can contain, for example, nitro groups, can also optionally be used.

The reaction time ranges from about 1 to 20 hours depending upon the reaction temperature and the nature and amount of catalyst used.

During the reaction or after the reaction has ended, in the case of a discontinuous procedure, the hydroxyaryl compounds formed in the process according to the invention can be removed by distillation. If the transesterification reaction is carried out by a continuous procedure, the hydroxyaryl compounds are separated off from the reaction mixture by fractional distillation.

According to a particularly preferred embodiment of the process according to the invention, the reaction is carried out using sodium phenolate, as the catalyst, in a mixture of polyester-diol and carbonic acid bis-aryl ester at about 110° C. to 150° C., with less than one mol of carbonic acid bis-aryl ester being employed per mol of OH group of the polyester-diol.

Thus, bis-carbonic acid monoaryl esters of polyester-diols lengthened via —OCOO— bridges can be prepared by the process according to the invention; in this process, it has been shown, surprisingly, that the lengthening proceeds smoothly, a quantitative esterification of the terminal hydroxyl groups taking place simultaneously. In addition, it has surprisingly been found that the molecular non-uniformity of the starting polyester-diols remains virtually unchanged during the lengthening with simultaneous esterification.

In the process according to the invention, the desired molecular weight $\overline{M}n$ of a lengthened and esterified polyester-diol (II) is determined by the amount of the diaryl carbonate (I) reacted with the polyester-diol; it is generally applicable that n mols of polyester-diol must be reacted with (n+1) mols of (I) in order to obtain a n-fold (ranging from 2to 20) polyester-diol, lengthened via —OCOO— groups, with terminal aryl carbonate groups.

The carbonic acid esters, obtained by the process according to the invention, of lengthened polyester-diols are valuable components, for example, of new copolymeric compounds. For example, the polyester-diol bis-aryl carbonates, obtained according to the invention, containing —OCOO— groups can be transesterified on the terminal aryl carbonate groups by selective reaction with bisphenols. Suitable bisphenols are, in particular, bis-(hydroxy-aryl)-alkanes, such as, for example, 2,2-bis-(4-hydroxy-phenyl)-propane (bisphenol A).

The polyester-diol bis-(hydroxyaryl) carbonates containing —OCOO— bridges, resulting from this transesterification, for example the corresponding polyester-diol bis-(4-(4-hydroxyphenol-isopropyl)-phenyl) carbonates, if appropriately mixed with excess bisphenol A, are components, for example, for the preparation of high-molecular aromatic polycarbonates, it being possible for this preparation to take place both by an interfacial polycondensation procedure and by a melt polycondensation procedure. Compared with other polycarbonate/polyester-diol copolymers, e.g., those of German Published Patent Specification No. 2,651,639 (U.S. patent application Ser. No. 845,174), these segmented polycarbonates, which contain incorporated polyester-diols according to the invention, have additional advantages, such as, for example, even better phase separation properties, which leads to better technological properties in the corresponding copolymers. (For a discussion of phase separation, see German Published Patent Specification No. 2,636,784).

Depending on the relative proportions of the starting components, plastic, more or less elastic, polyester/polycarbonates are obtained which can be used as an elastic sealing material. Furthermore, polyester polycarbonates of this type can be used as a starting material for hoses or as an insulating material in electrotechnology.

The reaction of the carbonic acid aryl esters, obtained according to the invention, of polyester-diols, lengthened via —OCOO— groups, with substituted phenols instead of bisphenols and with hydrazines leads to correspondingly substituted carbonic acid aryl esters of lengthened polyester-diols or, respectively, to bis-carbonic acid monohydrazides of polyester-diols lengthened via —OCOO— groups.

Unless otherwise indicated, the average molecular weights given in the examples which follow are number-average $\overline{M}n$, which were determined by osmometry.

The Staudinger index $[\eta]_{THF}$ indicated was measured in tetrahydrofurane at 25° C. and is given in the formula dl/g. For the definition of the Staudinger index, reference is made to H. G. Elias: "Makromoleküle" ("Macromolecules"), Hüthig & Wepf-Verlag, Basel, page 265.

EXAMPLES

EXAMPLE 1

800 parts by weight of a polyester-diol, obtained from n-hexane-1,6-diol and adipic acid, of average molecular weight $\overline{M}n=800$ (determined by measuring the OH number), 321 parts by weight of diphenyl carbonate and 0.1 part by weight of sodium phenolate are heated, while stirring and under nitrogen and a vacuum of 6 mm Hg, for 2 hours at 110° C., 2.5 hours at 130° C. and 3 hours at 150° C.; during this time, phenol is distilled off from the reaction mixture. If desired, residual traces of phenol can subsequently be separated off in a thin film evaporator at 190° C./0.1 mm Hg. A colorless, viscous oil with an average molecular weight $\overline{M}n$ of 1,820 is obtained. The OH number is zero; the Staudinger index $[\eta]_{THF}$ is 0.078.

EXAMPLE 2

2,000 parts by weight of a polyester-diol, obtained from adipic acid and equimolar amounts of ethylene glycol and butane-1,4-diol, of average molecular weight $\overline{M}n=2,000$ (determined by measuring the OH number), 321 parts by weight of diphenyl carbonate and 0.12 part by weight of sodium phenolate are heated; while stirring and under nitrogen and a vacuum of 3 mm Hg, for 2.5 hours at 110° C., 2 hours at 130° C. and 2.5 hours at 160° C. During this time, phenol is distilled off from the reaction mixture. If desired, residual traces of phenol can subsequently be separated off in a thin film evaporator at 110° C./0.1 mm Hg. A colorless, viscous oil with an average molecular weight $\overline{M}n$ of 4,240 and a Staudinger index $[\eta]_{THF}$ of 0.114 is obtained. The OH number is zero.

EXAMPLE 3

2,000 parts by weight of a polyester-diol, obtained from adipic acid and a mixture of n-hexane-1,6-diol/-neopentyl-glycol in the molar ratio 65/35, of average molecular weight $\overline{M}n$ 2,000 (determined by measuring the OH number), 321 parts by weight of diphenyl carbonate and 0.12 part by weight of sodium phenolate are heated, while stirring and under nitrogen and a vacuum of 2 mm Hg, for 2.5 hours at 110° C., 3 hours at 140° C. and 3 hours at 150° C. During this time, phenol is distilled-off from the reaction mixture. If desired, residual traces of phenol can subsequently be separated off in a thin film evaporator at 190° C./0.1 mm Hg. A colorless, viscous oil, which solidifies to a wax after some time and which has an averge molecular weight $\overline{M}n$ of 4,240, is obtained. The Staudinger index $[\eta]_{THF}$ is 0.25 and the OH number is zero.

EXAMPLE 4

2,000 parts by weight of a polyester-diol, obtained from adipic acid and a mixture of n-hexane-1,6-diol/-neopentyl-glycol in the molar ratio 65/35, of average molecular weight $\overline{M}n$ 2,000 (determined by measuring the OH number), 285 parts by weight of diphenyl carbonate and 0.12 part by weight of sodium phenolate are heated, while stirring and under nitrogen and a vacuum of 2 mm Hg, for 4 hours at 110° C., 3 hours at 140° C. and 5 hours at 155° C. During this time, phenol is distilled off from the reaction mixture. If desired, residual traces of phenol can subsequently be separated off in a thin film evaporator at 190° C./0.1 mm Hg. A colorless wax with an average molecular weight $\overline{M}n$ of 6,270 is obtained. The Staudinger index $[\eta]_{THF}$ is 0.32 and the OH number is zero.

EXAMPLE 5

2,000 parts by weight of polyester-diol, obtained from adipic acid and a mixture of n-hexane-1,6-diol/neopentyl-glycol in a molar ratio 65/35, of average molecular weight $\overline{M}n$ 2,000 (determined by measuring the OH number), 267.5 parts by weight of diphenyl carbonate and 0.12 part by weight of sodium phenolate are heated, while stirring and under nitrogen and a vacuum of 1 mm Hg, for 3 hours at 110° C., 5 hours at 140° C., 2 hours at 150° C. and 1 hour at 165° C. During this time, phenol is distilled off from the reaction mixture. If desired, residual traces of phenol can subsequently be separated off in a thin film evaporator at 190° C./0.1 mm Hg. A colorless wax with an average molecular weight $\overline{M}n$ of 8,290 is obtained. The Staudinger index $[\eta]_{THF}$ is 0.40 and the OH number is zero.

EXAMPLE 6 (Preparation of a polyester/polycarbonate)

6.1. Preparation of a polyester bis-(bisphenol A) carbonate which still contains 2.6 % by weight of bisphenol A.

313.5 parts by weight of the biscarbonic acid monoaryl ester, which has been prepared according to Example 4, of a polyester-diol, lengthened via carbonate groups and obtained from adipic acid and a mixture of hexane-1,6-diol and neopentylglycol in the molar ratio 65/35 of average molecular weight $\overline{M}_n$ 6,270, 31.3 parts by weight of 2,2-bis-(4-hydroxyphenyl)-propane (bisphenol A) and 0.03 part by weight of catalyst (sodium bisphenolate of bisphenol A to bisphenol=1:100) are heated, while stirring and under a nitrogen atmosphere, first for 1 hour at 125° C. and thereafter for 4 hours at 150° C. and under 0.05 mm Hg. During this time, 9.4 parts by weight of phenol are distilled off. A colorless wax is obtained.

6.2 Preparation of a polyester/polycarbonate with a polyester proportion of 50 % by weight 110.6 parts by weight of this viscous oil from Example 6.1, dissolved in 1,725 parts by weight of methylene chloride, are added to a solution of 80 parts by weight of bisphenol A and 1.77 parts by weight of p-tert.-butylphenol in 70 parts by weight of 45 per cent strength NaOH and 1,300 parts by weight of distilled water. 58.3 parts by weight of phosgene are passed in at 20°-25° C. in the course of 30 minutes, while stirring and under a nitrogen atmosphere. During this introduction, 126 parts by weight of 45 per cent strength NaOH are simultaneously added dropwise so that the pH value remains constant at pH 13. After passing in the phosgene, 39.8 parts by weight of a 1 per cent strength triethylamine solution are added and the mixture is stirred for 1 hour. The organic phase is separated off and washed successively with 2 per cent strength phosphoric acid and finally with distilled water until free from electrolytes. After separating off the water, the organic phase can be worked up by the following processes:

6.2.1 A high-strength (about 30–40% by weight) polymer solution is obtained by distilling off the $CH_2Cl_2$ down to a certain concentration or by adding chlorobenzene to the organic phase and distilling off the entire methylene chloride. The polyester/polycarbonate gels by subsequently slowly evaporating off the remaining methylene chloride or the chlorobenzene and can be further worked up to a powder grain mixture. The resulting polyester/polycarbonate is dried for 48 hours at 50° C. and 24 hours at 100° C.

6.2.2 A finely divided solid product is obtained by distilling of the solvent, drying the residue in a vacuum drying cabinet at about 80°–110° C. and under 15 mm Hg and subsequently grinding it.

6.2.3 By precipitating the polyester/polycarbonate from the organic phase using, for example, methanol, ethanol, isopropanol, acetone, aliphatic hydrocarbons and cycloaliphatic hydrocarbons, and subsequently drying the precipitate in a vacuum drying cabinet at 80°–110° C. and under 15 mm Hg.

6.2.4 By concentrating the organic phase in an evaporation extruder and subsequent extrusion at about 160°–240° C. under the conditions which are known for polycarbonate extrusion.

The relative viscosity of the polyester/polycarbonate obtained according to 6.2.1–6.2.4 is 1.63 (measured in $CH_2Cl_2$ at 25° C. and c=5 g/l). According to a determination by gel chromotography, the polyester/polycarbonate exhibits a maximum at 40,000. It contains 50% by weight of polyester and has a polycarbonate proportion of 50% by weight. Some mechanical properties of a film of the polyester/polycarbonate cast out of methylene chloride are:

| Tensile strength | 26.9 | (MPA) | (measured according to DIN 53,455) |
| --- | --- | --- | --- |
| Elongation at break | 366% | | (measured according to DIN 53,455) |

According to differential thermal analysis the granular polyester/polycarbonate exhibits a glass transition temperature (transformation temperature) of the polyester constituent of −38° C., a glass transition temperature (transformation temperature) of the amorphous polycarbonate constituent of 120° C. and a crystallite melting point of the crystalline polycarbonate constituent of about 190° C. The fusion enthalpy of the crystalline polycarbonate constituent is between 2.5 and 5.5 cal/g of polymer.

Investigations by gel chromatography were carried out in tetrahydrofurane with Styragel columns (separation range: $1.5 \times 10^5$ Å, $1 \times 10^5$ Å, $3 \times 10^4$ Å and $2 \times 10^3$ Å) at room temperature. The calibration of bisphenol A polycarbonate was used for the determination. Compared with the $\overline{M}n$ determination by the light scattering method, no large deviations were observed.

The differential thermal analysis (DTA) was carried out using a "Du Pont (E. I. du Pont de Nemours and Co.) model 900" apparatus. For the interpretation of the transformation temperature, the approximate middle of the softening range, according to the tangent method, was chosen and for the crystallite melting point, the approximate middle of the endothermic peak of the melting curve was chosen.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of carbonic acid aryl esters of polyester-diols, lengthened via —OCOO— groups, comprising the steps of heating a polyester-diol having alcoholic end groups and a molecular weight Mn greater than 250 with a carbonic acid bis-aryl ester at a temperature between about 100° C. and 200° C. and under a pressure of less than about 35 mm Hg in the presence of a transesterification catalyst, and distilling off the hydroxyaryl compound formed, characterized in that n mols of the polyester-diol are reacted with n+1 mols of the carbonic acid bis-aryl ester to obtain an n-fold polyester-diol, lengthened via —OCOO— groups, with terminal aryl carbonate groups.

2. The process according to claim 1, wherein the polyester-diol has a molecular weight $\overline{M}n$ of over 600.

3. The process according to claim 1, wherein the reactants are heated at a temperature between about 110° C. and 180° C.

4. The process according to claim 1, wherein the reaction is conducted under a pressure of between about 25 and 1 mm Hg.

5. The process according to claim 1, wherein the carbonic acid bis-aryl ester is one having the general formula

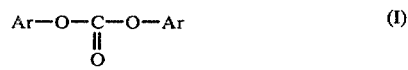

(I)

wherein Ar is a substituted or unsubstituted aryl radical having from 6 to 18 carbon atoms.

6. The process according to claim 5, wherein the radical Ar is selected from the group consisting of $C_1$ to $C_4$-alkyl-, nitro- and halo-substituted aryl radicals.

7. The process according to claim 1, wherein the catalyst is selected from the group consisting of alkali metal phenolate, alkaline earth metal phenolate, alkali metal alcoholate, alkaline earth metal alcoholate, tertiary amine, antimony trioxide, zinc chloride, titanium tetrachloride and tetrabutyl titanate.

8. The process acccording to claim 1, wherein the catalyst is used in an amount between about 20 ppm and 200 ppm, relative to the total weight of polyester-diol and carbonic acid bis-aryl ester.

9. The process according to claim 1, wherein the reaction is carried out in bulk.

10. The process according to claim 1, wherein the reaction is carried out in the presence of an inert solvent.

11. The process according to claim 1, wherein the reaction is continued from about 1 to 20 hours.

12. The process according to claim 1, wherein the catalyst is sodium phenolate and the reaction temperature ranges from about 110° C. to 150° C.

13. A process for the preparation of a compound of the general formula

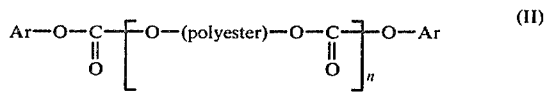

(II)

wherein Ar is a substituted or unsubstituted aryl radical having from 6 to 8 carbon atoms, "—(polyester)—" is a bivalent radical of a polyester-diol having alcoholic end groups and a molecular weight $\overline{M}n$ above 250, and n is an integer from 2 to 20, comprising the steps of reacting n mols of polyester-diol with (n+1) mols of the carbonic acid bis-aryl ester of the general formula (I)

14. Compounds of the general formula
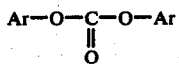
(I)
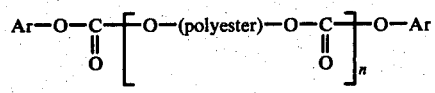
wherein AR is a substituted or unsubstituted aryl radical having 6 to 18 carbon atoms, "—(polyester)—" is a bivalent radical of a polyester-diol having alcoholic end groups and a molecular weight $\overline{M}n$ greater than 250, and n is an integer from 2 to 20.
15. The compound according to claim 14, wherein n is an integer from 2 to 10.
* * * * *